United States Patent Office 3,609,769
Patented Oct. 5, 1971

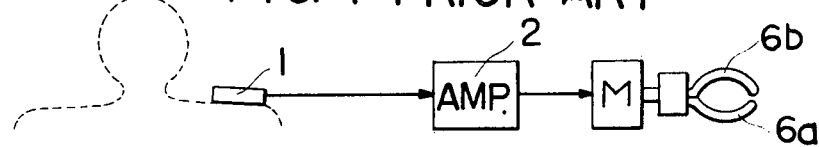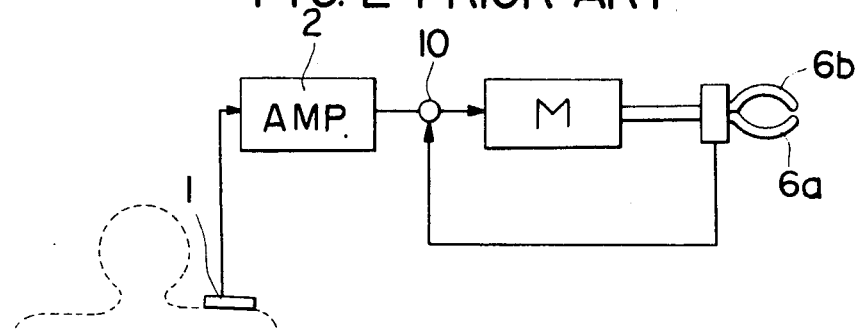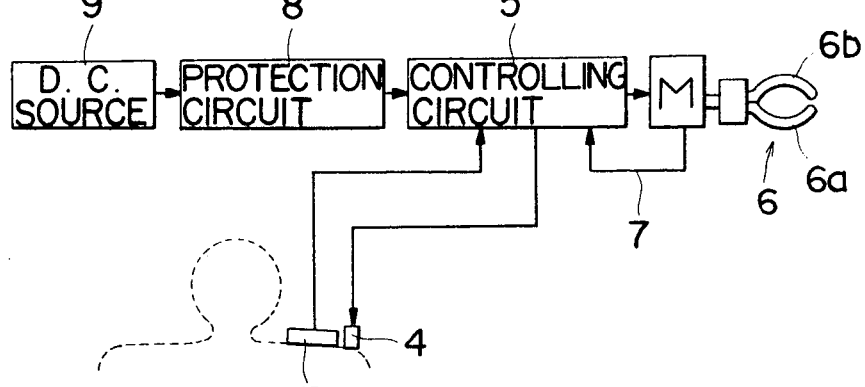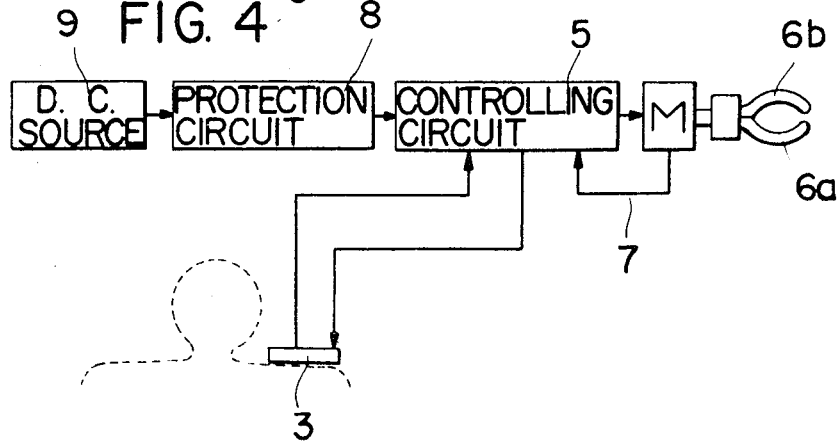

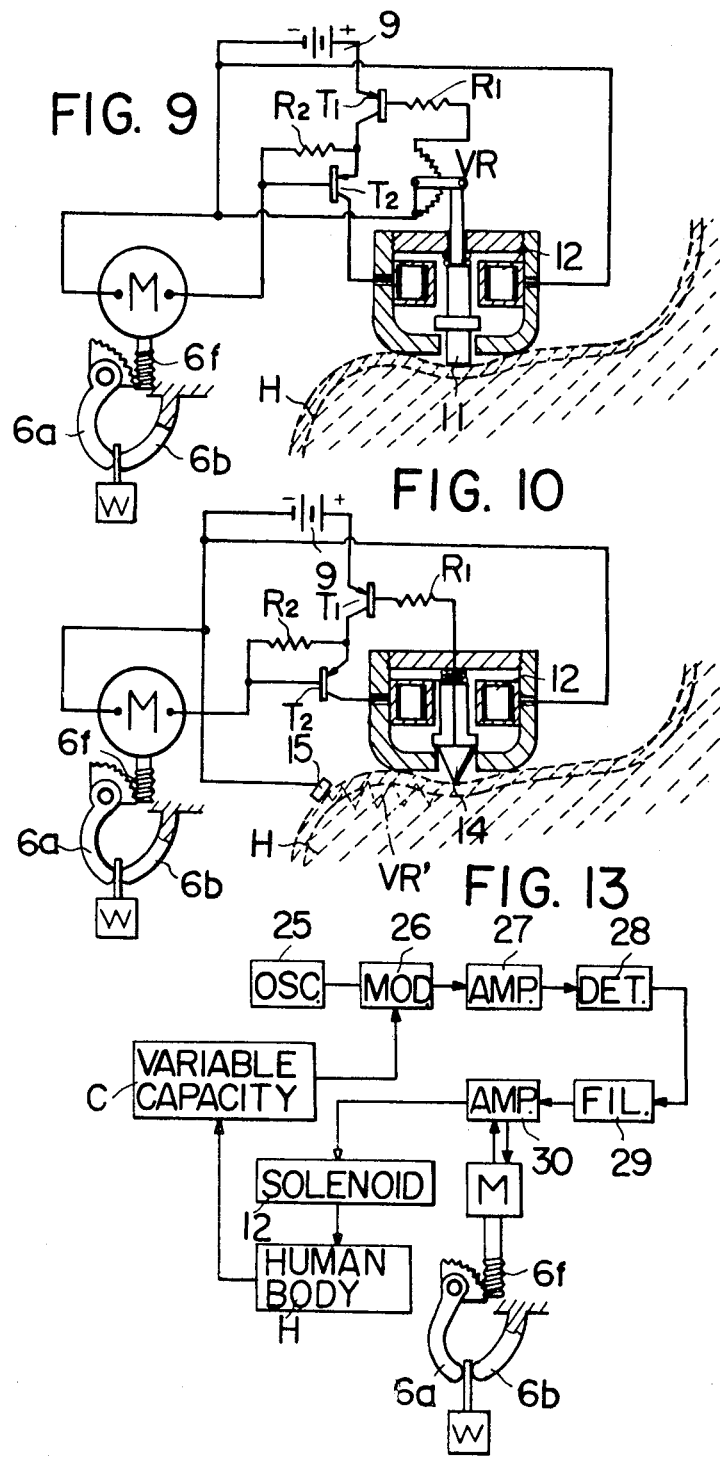

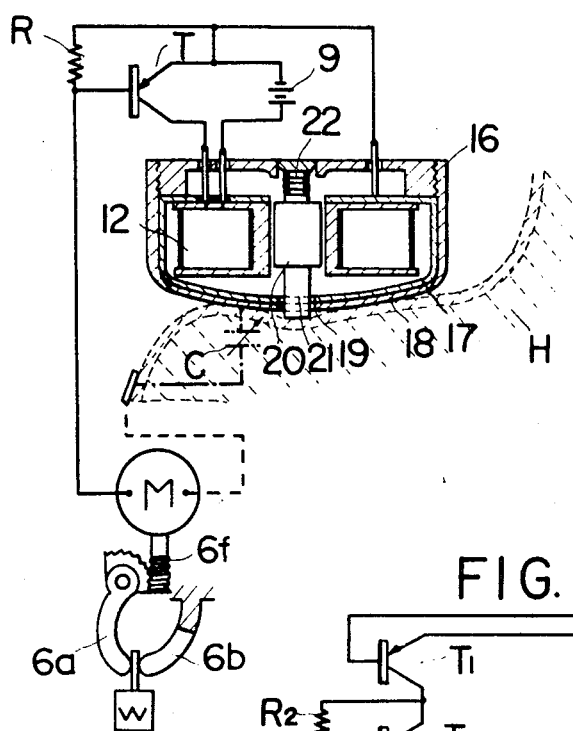
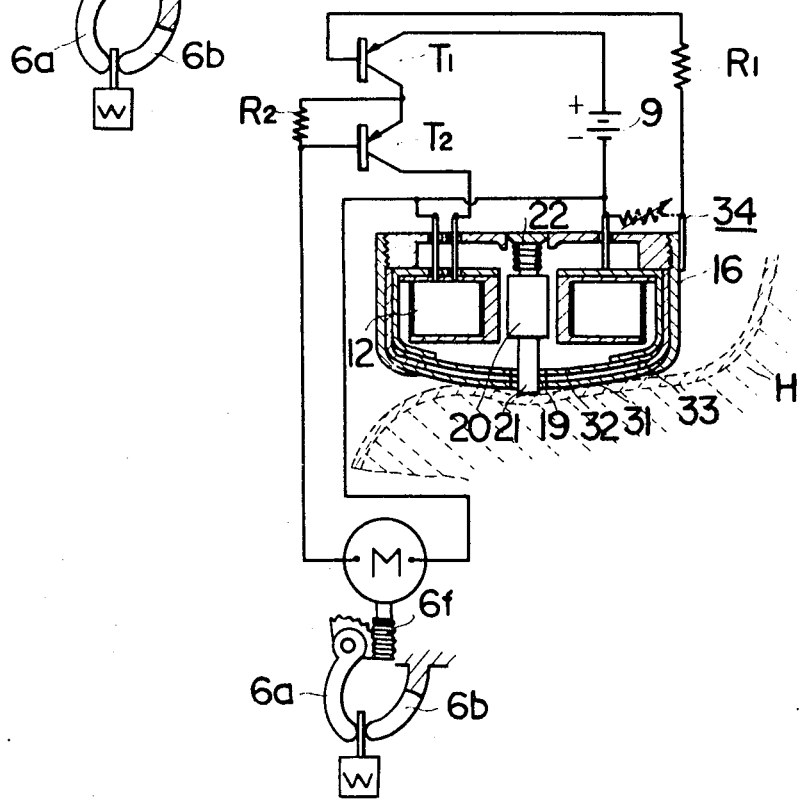

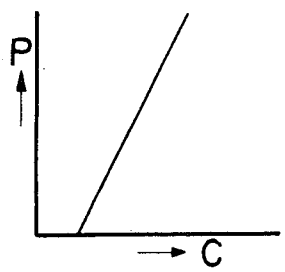
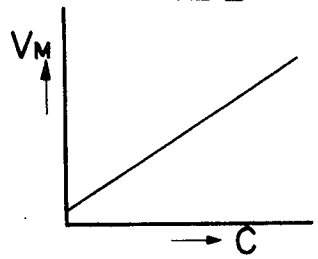
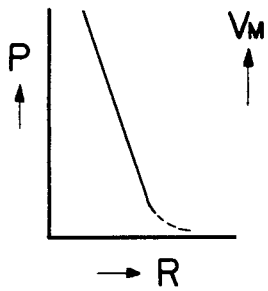
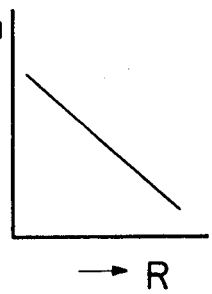
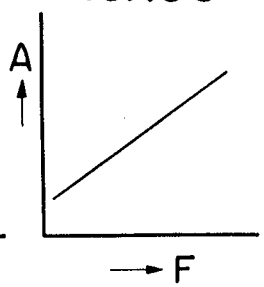
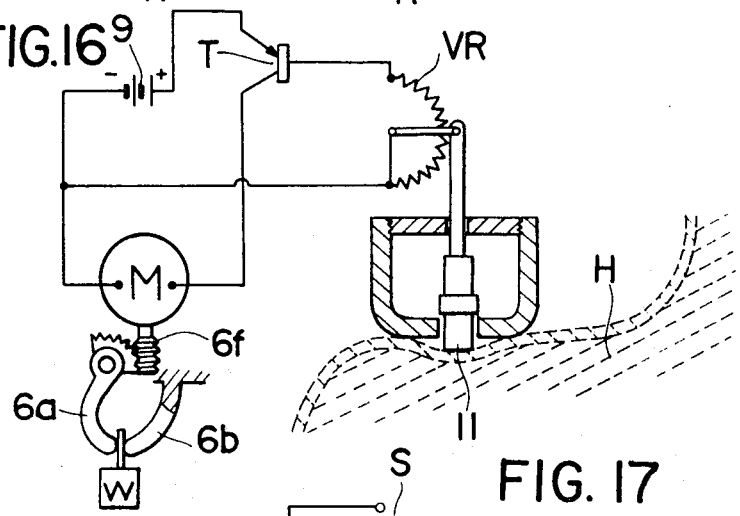
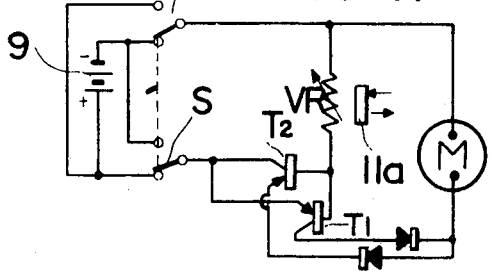

3,609,769
CONTROL SYSTEM FOR ELECTRICALLY POWERED ARTIFICIAL LIMBS
Tsutomu Suzuki, Shiga-ken, Fumio Hayakawa, Kyoto-fu, and Kouichi Yaida, Osaka-fu, Japan, assignors to Omron Tateisi Electronics Co., Kyoto-fu, Japan
Filed Apr. 2, 1969, Ser. No. 812,742
Claims priority, application Japan, Apr. 2, 1968, 43/21,607; May 8, 1968, 43/30,699, 43/37,382, 43/37,383
Int. Cl. A61f 1/00, 1/06
U.S. Cl. 3—1.1            12 Claims

ABSTRACT OF THE DISCLOSURE

The artificial limbs of the invention are for use as mechanical limbs, and especially for those whose limbs are missing from the high positions, which take over functions similar to those of the living body, having a control system to control the drive of the motor for operating the artificial limbs in accordance with the user's own will while the driving conditions of the motor are sensed by himself.

---

This invention relates to a control system for electrically powered artificial limbs operable to convert the movements of a small portion of the human body into electrical signals to control a motor for operating the artificial limbs, and more particularly to a control system for electrically powered artificial limbs preferably effective to feed-back the signals generated by detecting the driving conditions of a DC micro-motor for operating the artificial limbs, of which the speed and working torque can be made variable, to a means for stimulating the pressure sensitive nerves of a small region of the user and thereby being able to control the drive of said motor to the user.

The artificial limbs of the invention are a kind of mechanical apparatus which may be operated by the user to bring about movements similar to those of natural limbs, such as a hand, arm, foot or leg of the living body, so that they include the magic hand, the cybernetic organ and the like. The artificial upper limbs for those who have missing hands are shown hereinafter as one example of the invention.

It is a matter of course that when the human being tries to grasp an object with his hand, he will instinctively adjust the grasping force in accordance with the nature of the object, i.e. hardness or softness or weight, of the object to be grasped, through control from his nervous system in response to sensory stimuli. In order for the artificial limbs to likewise take over functions similar to the natural limbs of the living body, it is necessary to control the movements of the artificial limbs through the sensory perception of the user carrying them in accordance with their movements by providing a feed-back control therein.

Prior to the invention, artificial limbs have been provided with a control system comprising, for example, a means for measuring the skin's static electric current through a current collecting element 1 fitted close to a voluntary muscle of the human body and an amplifier 2 for amplifying said current thus measured to operate a motor M adapted to drive the artificial limbs 6a, 6b as shown in FIG. 1, or a means for converting carbon dioxide into gaseout pressures according to the movements of the human body for controlling pistons provided in the artificial limbs. However, either of these control systems is a constant value control system wherein only the user of the artificial limbs can unilaterally command the operation, i.e., the driving or the stopping, of the limbs, and, therefore, such systems are insufficient in practical use. In addition, in such systems the user must always watch the operation of the artificial limbs in order to set them in proper operation, because no means for informing the user of the driving conditions of the motor and consequently the operational modes of the artificial limbs is provided therein. This characteristic creates many defects, for example, such as impossibility of the proper grasping action of the artificial limbs, possibility of breaking an object to be grasped because of the excessive output torque of the motor in comparison with the nature of the object, and the possibility of braking the motor itself because of the unexpected overload applied thereto. Thus, the conventional artificial limbs are far more different than the hands of the living body.

Furthermore, in the conventional arrangement of electrically powered artificial upper limbs wherein a control mechanism comprising a current collecting element 1 fitted close to a voluntary muscle of the human body for measuring the skin's static electric current and an amplifier 2 for amplifying said current thus measured to operate a motor M are provided, erroneous controls often occur because the muscular electricity pattern and the muscular electricity detecting position of the human body are respectively different from person to person and also because of the complex structure resulting from the requirement that the output of the motor M be fed back to the comparison circuit 10, as shown in FIG. 2, for preventing said motor from being overloaded.

Therefore, one important object of this invention is to provide a control system for electrically powered artificial limbs having a means for converting the movements of a small portion of the user's body into electrical signals and therewith controlling positively the operation, i.e., the driving or the stopping and making the change of the driving conditions, of said artificial limbs without any erroneous control.

Another important object of the invention is to provide a control system includable in a system of electrically powered artificial limbs having a means for positively informing the user of the driving conditions of a motor adapted to drive said artificial limbs.

A further essential object of the invention is the provision of a control system for electrically powered artificial limbs for controlling the operation of said artificial limbs in accordance with the user's own will, while the driving conditions of a motor are sensed by the user himself.

A further object of the invention is to provide electrically powered artificial limbs of the character indicated that are simple, compact and light-weight in design; that are durable in construction; that are reasonable in manufacturing cost; and that are capable of performing their intended functions in an entirely satisfactory and trouble-free manner.

A still further object of the invention is to include a control mechanism for controlling the movements of electrically powered artificial limbs having a simple enough structure to mount in any of the electrically powered artificial limbs heretofore in use.

The principal components of the electrically powered artificial limbs include a battery as the power source, a DC motor which converts electric energy into mechanical energy, a frame forming the structure of the limbs, the control mechanism and its circuits.

The control mechanism according to the invention comprises an actuator 3 as shown in FIG. 3 operable in response to muscular movement of, for example, a shoulder of the user to which it is closely fitted and a stimulator 4 of which the operation can be detected by the user when it stimulates a portion of the user's shoulder. The motor M which is effective to drive a movable finger 6a of the artificial limb 6 can be controlled by the actuator 3, the operation of which may be converted into a certain action, such as ON-OFF actions of a switching device, moving actions of a electromagnetic means or variations of a resistor element and a condenser element through a signal transmitting device including a detector, amplifier, and others in the controlling circuit 5 for controlling said motor M. In the control mechanism above mentioned, a feed-back loop for returning to the stimulator 4 signals representative of the driving conditions of the motor M, i.e., some portion of the input or the output of the motor M, is provided so as to cause the stimulator 4 to act in the opposite direction relative to the actuator 3 so that the driving conditions of the motor M can be detected by the user. In addition, a protection circuit 8, including a transistor for preventing the motor M from being overloaded, and the DC power source 9 are provided therein.

Therefore, the control mechanism according to the invention is effective to control the driving speed and the working torque of the motor M when the actuator 3 is actuated in one direction by the user and is effective to detect the driving conditions of the motor M for the user when the stimulator 4 is correspondingly moved in the other direction, toward the user, by the motor M. Of course, a closed loop between the human body and the control mechanism through the media of the actuator 3 and the stimulator 4 is provided for the interrelative control operation, that is the sensory nervous action, for causing the artificial limb to provide functions similar to the living arm. The actuator 3 may be fitted close to a small region of the human body such as a shoulder or the adjacent region where it is effective to operate the actuator 3, and the stimulator 4 may be fitted to a small portion of the human body such as a shoulder or the adjacent portion where the pressure sensitive nerves are located to sense the action of the stimulator.

A satisfactory result is achieved in connection with the control operation of the actuator 3 and the stimulator 4 in that the contact surface of the actuator against the human body is larger than that of the stimulator and the stimulator is arranged in the area to which the operation of the actuator is effected.

The actuator 3 may be integrally constructed with the stimulator 4 in one unit as shown in FIG. 4. Furthermore, the control mechanism of the invention as shown in FIG. 3 or FIG. 4 can be incorporated in the artificial limb shown in FIG. 5 in connection with each of the motors $M_1$ to $M_4$. In this case, a motor $M_1$ will act to drive the movable finger 6a of the artificial limb so as to grasp an object securely with the stationary finger 6b, a motor $M_2$ will act to rotate the wrist 6c thereof, a motor $M_3$ will act to flex the elbow 6b thereof, and a motor $M_4$ will act to swing the shoulder 6e in all directions. Accordingly, these control mechanisms in connection with each of the motors can achieve artificially similar functions of the living body such as the flexion and extension of the elbow, rotation of the forearm, opening and closing of the hand and fingers, as well as turning of the shoulder in all directions.

The enumerated objects and other objects, together with the advantages of this invention, will be readily understood by persons trained in the art from the following detailed description and the accompanying drawings which describe and illustrate several preferred forms of the control system for the electrically powered artificial upper limbs embodying the invention. In the drawings, wherein like reference numerals denote corresponding parts throughout the several views:

FIGS. 1 and 2 are block diagrams showing an electrical circuit of a control system for the artificial upper limbs of a conventional type respectively;

FIGS. 3 and 4 are block diagrams showing an electrical circuit of a control system for the electrically powered artificial upper limbs of this invention respectively;

FIGS. 8 to 10 are several circuit diagrams showing the electrical components of various other modified embodiments of the control system for the electrically powered artificial upper limb as shown in FIG. 6 respectively;

FIG. 11 is a circuit diagram showing the electrical components of the control system for the electrically powered artificial limb having an actuator and a stimulator respectively embodying the invention;

FIGS. 12(A) and 12(B) are graphs showing the electrical characteristics in connection with the circuit operation of the control system of FIG. 11;

FIG. 13 is a block diagram showing an electrical circuit of the control system for the electrically powered artificial limb of the invention;

FIG. 14 is a circuit diagram showing the electrical components of another modified embodiment of the control system for the electrically powered artificial limb as shown in FIG. 11;

FIGS. 15(A) to 15(C) are graphs showing the electrical characteristics in connection with the circuit operation of the control system of FIG. 14; and FIGS. 16 and 17 are circuit diagrams showing an electrical circuit of a control system for the artificial limb without the feedback loop embodying the invention.

Figure 5:
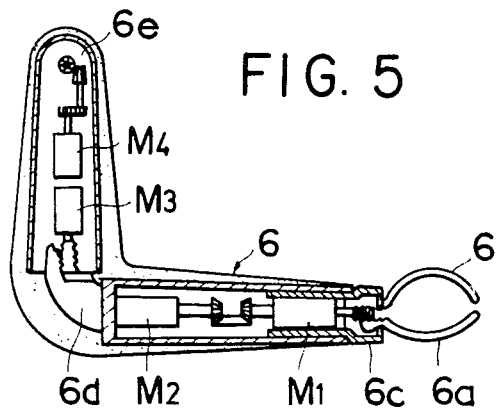
FIG. 5 is a sectional view of an electrically powered artificial upper limb mounted with micromotors therein embodying the invention.
Figure 7:
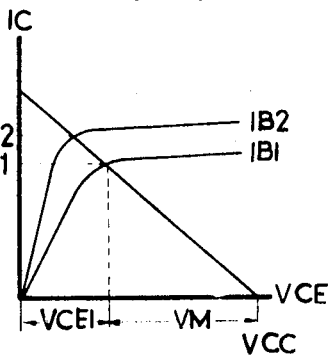
FIG. 7 is a schematic graph showing the characteristics of a transistor $T_1$ employed in the circuit of the control system shown in FIG. 6 for preventing a motor from being overloaded.
Figure 6:
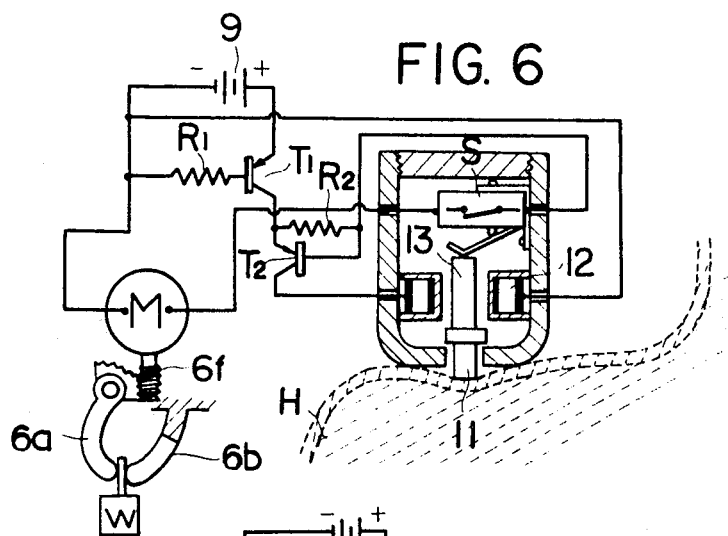
FIG. 6 is a circuit diagram showing the electrical components of the control system for the electrically powered artificial upper limb of the first embodiment of the invention.

The first preferred embodiment of the invention will be now described with reference to FIG. 6. An electrically powered artificial upper limb as shown in FIG. 6 is constructed in such a way that a movable finger 6a thereof can be moved by the drive power transmitted from a motor M through a worm gear 6f and thus to grab a load W between said movable finger and a stationary finger. Said motor M may be driven when an electromagnetic switch S is actuated through its push-button 11 which may be translated by movements of a portion of the user's body H, for example muscular movements of a shoulder of the user. A current from the power source 9 for driving the motor M may be fed through a transistor $T_1$ and the electromagnetic switch S to the motor M. Said transistor $T_1$ is employed for preventing the motor M from being overloaded and has the VCE–IC output characteristics as shown in FIG. 7, so that the maximum power voltage VM of the transistor $T_1$ may be restricted to the difference between the battery voltage VCC of the power source 9 and the voltage VCEI applied between the collector and emitter of said transistor. And the base current $I_B$ of transistor $T_1$ may be restricted by the resistor $R_1$ connected with the base of the transistor.

On the other hand, the electromagnetic switch S is arranged so that a solenoid 12 provided therein may act to attract the push-button 11, integrally connected to an iron core 13, downwards in the opposite direction of said movements of the user's body H so as to switch said switch S off when the supply current to the motor M is amplified by a transistor $T_2$ and fed thereto. Accordingly, so long as the force required to press said push-button 11 upwards through muscular movements of a shoulder of the user H is greater than the force required to cause the solenoid to attract said push-button, i.e., iron core 13, downwards in proportion to the current fed from the motor M, the switch S is closed to drive the motor M. Otherwise the switch S is open to stop the motor.

In the control system thus designed as heretofore described, since the supply current of the motor M is transmitted to the solenoid 12 as a reaction of the push-button 11 pressed upward to cause the switch to be closed, the working torque of the motor, M, i.e. the grapsing force by the movable and stationary fingers 6a and 6b, is transmitted to the user only if we assume that the mechanical loss and other conditions of the power to be delivered from the motor M to the movable finger 6a are constant.

Figure 8:
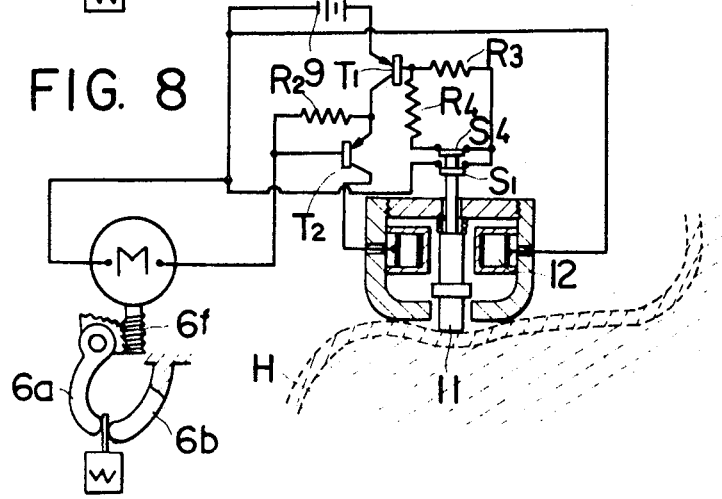

Referring to FIG. 8, in the second preferred embodiment of the invention, the electromagnetic switch S and the base resistor $R_1$ around the transistor $T_1$ are respectively replaced by a two-way switch having two pairs of contacts $S_1$ and $S_4$ and two resistors $R_3$ and $R_4$ arranged in a parallel circuit. Under the condition where the push-button 11 common to the contacts $S_1$, $S_4$ is not depressed, all contacts are kept open and therefore the circuit is cut off. When the push-button 11 is depressed upwards to a position at the middle stage through muscular movements of the user's body H, one of the pairs of contacts $S_1$ is closed and therefore the resistor $R_3$ becomes the base resistor for the transistor $T_1$. When the push-button 11 is depressed further upwards to a position at the upper stage, all contacts $S_1$ and $S_4$ are closed and therefore the resistors $R_3$ and $R_4$ become the base resistors to the transistor $T_1$. Thus, the value of the base resistor to the transistor $T_1$ can be alternatively selected as either $R_3$ or $1/R_3+1/R_4$ and the value of the base current IB of the transistor $T_1$ correspondingly changes from $IB_1$ to $IB_2$ resulting in a variation of the voltage VM for driving the motor M, that is, resulting in the grasping force by the movable and stationary fingers 6a and 6b being controlled to a small or large degree.

Even in the control system thus designed with regard to the second embodiment heretofore described, the supply current of the motor M is transmitted to the solenoid 12 through which a reaction of the push-button 11 is transmitted to the user. However, the maximum power voltage for driving the motor M can be changed to either of the two values.

Further explanation of this embodiment and other embodiments hereinafter described will be omitted with respect to those components to which the same reference numerals are employed throughout the description of all embodiments of the invention, because they should now be clearly understood without any further explanation.

Referring to FIG. 9, in the third embodiment of the invention, the electro-magnetic two-way switch having contacts $S_1$, $S_4$, shown in FIG. 8 is removed and the base resistors $R_3$ and $R_4$ arranged in a row with regard to the transistor $T_1$ as shown in FIG. 8 are replaced by a resistor $R_1$ and a variable resistor VR arranged in series with the push-button 11 of a solenoid device 12 which is operable in cooperation with said variable resistor. It will be clearly understood that the value of the resistor VR changes continuously from low to high as the push-button 11 is depressed gradually upwards through muscular movements of the user's body H, resulting in the successive variation of the total value of the base resistors $R_1+VR$ from low to high. Accordingly, the driving torque of the motor M also changes so that the grasping force of the movable and stationary fingers 6a and 6b can be continuously controlled.

Even in the control system thus designed with regard to the third embodiment heretofore described, the supply current of the motor M is transmitted to the solenoid 12 through which a reaction by the push-button 11 is transmitted to the user. However, the maximum power voltage for driving the motor M can be continuously changed through the operation of the variable resistor VR which is operable in cooperation with the push-button 11.

Referring to FIG. 10, in the fourth embodiment of the invention, the push-button 11 shown in FIG. 9 of the solenoid device 12 is here removed, but, instead of the variable resistor VR, the skin of a shoulder of the user's body H spaced between electrodes 14 and 15 in contact thereto serves as a variable resistor VR the value of which may be variable in accordance with an increase or decrease of the pressing strength and/or area of contact of the electrode 14 while the electrode 15 is rigidly fitted to the user's body H. The resistance variation between the electrodes 14 and 15 through the skin can be achieved by forming a contact end of the electrode 14, for example into the tapered shape as shown in FIG. 10.

Therefore, as the value of the base resistance $R_1+VR'$ with regard to the transistor $T_1$ varies, the base current IB of the transistor $T_1$ correspondingly varies resulting in the variation of the voltage VM for driving the motor M and thus a change in the driving torque of the motor M. The change in the driving torque of the motor M may reduce or increase the grasping force by the movable finger 6a and the stationary finger 6b.

Even in the control system thus designed with regard to the fourth embodiment of the invention, the supply current of the motor M is transmitted to the solenoid 12 through which the reaction of the electrode 14 is transmitted to the user. However, the control system is effective to sense the variation of the contact resistance of the electrode 14 through the skin of the user's body H.

Referring to FIG. 11, in the fifth embodiment of the invention, reference numeral 16 designates a cylindrical hollow casing rigidly provided with a plate electrode 17 having a large smooth curved surface facing the shoulder of the user's body H. Said surface of the plate electrode 17 is also covered with an insulating film 18. Extending through a hole 19 provided in the center of said surface of the plate electrode 17 is a stimulator rod 21 of plastic material rigidly secured to a movable iron core 20. One end of said rod 21 opposite to the iron core 20 is arranged so as to be in contact with a small portion of the users' shoulder H. Reference symbol T designates a transistor for amplification and reference symbol R designates a resistor connected to the base of the transistor T. A current from the power source 9 may be controlled by a variable condenser C, comprising the plate electrode, the insulating film and the movable electrode formed by the user's body H, which current is made to flow to the motor M, and the output current from the motor M is supplied to a solenoid 12 through the transistor T where amplification takes place subject to said output current.

As for the variable condenser C, although the skin of the human being is generally considered to be an insulator of a kind, it is very thin and sometimes sufficiently wet to act as a conductor. Therefore, if the user's body H is employed as an electrode relative to the other electrode 17 in a manner, for example, as to connect a line at a lower portion of the shoulder, said variable condenser C is formed while the insulating film and the skin of the user serve as a dielectric. Generally speaking, while the casing 16 including the solenoid 12 and the iron core 20 is fitted close to the shoulder of the user and up-and-down movements of the user's shoulder are effected in such a manner as to vary movement of the plate electrode 17, the relative distance between the electrode 17 and the user's body H and the contact area between the skin of the user's shoulder H and the insulating film 18 may vary thereby controlling the static electric capacitance therebetween. According to the experiments carried out to measure the static electrical capacitance of the variable condenser C dependence upon the pressure P applied to press the plate electrode 17 through muscular movements of the user's shoulder H, it has been found that the static electrical capacitance of the variable condenser C increases substantially in proportion to the increase of the pressure P as shown in FIG. 12(A). Therefore, the structure as heretofore described is practical for use as variable condenser C.

With the use of the variable condenser C thus designed in the circuit as shown in FIG. 13, when output signals from an oscillator 25 are modulated in a modulator 26 into electrical potentials depending upon variation of the capacitance of the variable condenser C and then supplied to the motor M through an amplifier 27, detector 28, filter 29, and an amplifier 30, the input potential to the motor M can be adjusted in accordance with the variation in the capacitance of the variable condenser C, resulting in an increase or decrease of the driving torque of the motor in proportion to said input potential. Therefore, the grasping force by the movable and stationary fingers 6a and 6b can be adjusted by controlling the muscular movements of the user's shoulder H to press the plate electrode 17.

Furthermore, it has been found that the static electrical capacitance of the variable condenser C and the terminal voltage VM of the motor M increase substantially in proportion to each other as shown in FIG. 12(B) when the static electrical capacitance applied in the circuit as shown in FIG. 13 with block diagram varies. Therefore, the variable condenser C can be effectively applied as a means for controlling the driving torque of the motor M. By taking the graphs as shown in FIG. 12(A) and FIG. 12(B) under consideration, it can be clearly seen that, as the pressure P required to press the plate electrode 17 by means of the user's body H increases (FIG. 12(A)), the voltage VM for driving the motor M, i.e., the driving torque of the motor M correspondingly increases (FIG. 12(B)), and vice versa. Thus, the pressure against the plate electrode 17 is effective to control continuously the driving torque of the motor M.

In addition, since an output potential, or input potential, from the motor M thus controlled is fed to the solenoid 12 in the casing 16 through a feedback loop in which said potential is amplified, as shown in FIG. 13, the movable iron core 20 is attracted against the force of a spring 22 in proportion to the value of said potential to cause the tapered end of the stimulator rod 21 to project out of the hole 19 provided in the plate electrode 17 and then to stimulate a portion of the user's shoulder H to a variable extent.

Thus, the control system of this preferred embodiment is effective to control the driving torque of the motor M, the driving conditions of which are detected by the user through the intensity of stimulation of the stimulator rod 21.

Referring to FIG. 14, in the sixth embodiment of the invention, reference numeral 16 designates a casing to be fitted close to the user's body H, the bottom thereof being provided with a flexible plate electrode 31 of current conducting rubber and a stationary plate electrode 32 laminated in piles with a slight spacing between the two electrodes. A variable resistor 34 is formed between the two electrodes 31 and 32 while a plate insulator 33 is arranged therebetween. Said variable resistor 34 is effective to change its value of resistance continuously when the contact area and the contact pressure between said two electrodes 31 and 32 vary depending upon the pressure effected by the user's body H to deform the flexible plate electrode 31. FIG. 15(A) shows the relation between the pressure P applied to press the electrode 31 and the corresponding resistance value R of the resistor 34 at actual measurement. From this figure, it can be clearly understood that the value R will decrease as the pressure P applied increases.

In addition, when an output potential from the motor M is fed to the solenoid 12 in the casing 16 through a feedback loop of the motor M and the power source 9, the movable iron core 20 is attracted against the force of a spring 22 in proportion to the value of said potential to cause the stimulator rod 21 to project out of the hole 19 provided in the plate electrodes 31 and 32 and then to stimulate a portion of the user's shoulder H to a variable extent. Thus, the control system of this preferred embodiment is effective to control the driving torque, the motor M of the driving conditions of which can be detected by the user through the intensity of stimulation of the projected end of the stimulator rod 21. FIG. 15(C) shows the relation between the current A fed to the solenoid 12 and the corresponding increase of the magnetic force F effected on the movable iron core 20. From this figure, it can be clearly understood that the magnetic force F generated in the solenoid 12 increases as the current A increases. Reference symbol $T_1$ is a transistor employed for preventing the motor M from being overloaded, $R_1$ is a resistor connected to the base thereof, $T_2$ is a transistor for amplification, and $R_2$ is a resistor connected to the base thereof.

A current from the power source 9 flows through the transistor $T_1$, the base resistance of which is regulated by the variable resistor 34 connected with the two electrodes 31 and 32 to the motor M. The output current from the motor M is amplified in the transistor $T_2$ and fed to the solenoid 12. FIG. 15(B) shows the relation between the resistance value R of the variable resistor 34 in the circuit above described and the terminal voltage VM of the motor M. From this figure, it can be clearly understood that the voltage VM for driving the motor M, i.e., the driving torque of the motor M, increases as the value R of the resistor 34 decreases.

Now, by taking the graphs as shown in FIGS. 15(A), 15(B) and 15(C) under consideration, it can be understood that the driving torque of the motor M increases incident to the increase of the pressure P applied to press the plate electrode 31 by means of muscular movements of the user's shoulder H since the value of the resistor 34 becomes small.

Thus, the control system of the sixth embodiment is effective to control the driving torque of the motor M, the driving conditions of which are detected by the user through the intensity of stimulation provided by means of the stimulator rod 21 to be operated through the movable iron core 20 in connection with the solenoid 12 to which the output potential from the motor M is supplied.

Although the heretofore described embodiments of the invention are provided with respective feedback circuits for controlling the drive of the motor M, the seventh embodiment as hereinafter fully described provides a structure without a feed-back circuit.

Referring to FIG. 16 in which the feed-back circuit is not provided, a transistor T for preventing the motor M from being overloaded is arranged between the motor M and the DC power source 9 and a variable resistor VR is connected to the base of said transistor T. This circuit is effective to control an overload to the motor M in accordance with the VCE–IC output characteristics of the transistor T. The base current IB of the transistor T controlled by the variable resistor VR is effective to control the maximum power current to the motor M. That is, the maximum power voltage VM for driving the motor M is the difference between the power voltage VCC of the power source 9 and the collector-emitter voltage VCE of the transistor T as can be understood from FIG. 16. Therefore, as the value of the variable resistor VR varies to reduce or increase the flow of the base current IB of the transistor T, the amount of the current for driving the motor M correspondingly varies.

Said variable resistor VR is arranged such that a push-button 11 connected to the tap bar of the variable resistor VR can be operated by means of muscular movements of the user's shoulder. Therefore, when the push-button 11, for example, positions at the lowest position, the value of the variable resistor VR becomes small and the base current IB of the transistor T becomes correspondingly small, resulting in the production of a high voltage VM to the motor M to give a high grasping force to the movable and stationary fingers 6a and 6b.

Instead of the push-button 11 shown in FIG. 16, by changing the impedance, the amount of the base current IB can be changed. In the circuit shown in FIG. 17, p-n-p transistors $T_1$ and $T_2$ are employed in a row with a switch S in order to convert the polarities of the current to be fed from the power source 9 to the motor M. By operating the switch S, the motor M can be turned in either of the opposite directions to close or open the movable finger 6a relative to the stationary finger 6b.

Furthermore, the skin resistance of the human body may be, for example, employed as the resistor VR shown in FIG. 16. In this case, the contact resistance between the human body and a movable member formed as an electrode will vary incident to the variation of the contacting force and area therebetween.

The control system in this seventh embodiment is of a simple structure comprising the motor M for operating the artificial limb 6a, transistor T for preventing the motor from being overloaded, variable resistor element VR for controlling the flow of the base current of said transistor T, and movable members 11 and 11a. The artificial limb incorporated wtih said control system thus designed can be optionally controlled by the user since, when the movable members are moved by the user, the value of the variable resistor element varies so as to vary the base current of the transistor, resulting in an increase or decrease in the power voltage for driving the motor.

The aspects and objects of this invention have been described and illustrated in detail with reference to the embodiments thereof, and will become more apparent from the scope of the invention as defined in the appended claims.

What we claim is:

1. A control system for the electrically powered artificial limbs, comprising an artificial limb,
   a motor for driving said artificial limb,
   a power source for supplying operating current to said motor,
   means for controlling said operating current for driving said motor in accordance with movements of the human body, and
   feedback means connected to and directly responsive to the driving current of said motor for stimulating the pressure sensitive nerves of the human body in proportion to said driving current.

2. A control system for the electrically powered artificial limbs according to claim 1, wherein said controlling means comprises
   an electromagnetic means, and
   at least one switch operable in cooperation with said electromagnetic means,
   the current for driving said motor being controlled through switching actions of said switch in accordance with movements of the human body.

3. A control system for the electrically powered artificial limbs according to claim 1, wherein said controlling means comprises
   a variable resistor element having a resistance which varies in response to movements of the human body,
   the current for driving said motor being controlled in response to the changing value of said resistor element.

4. A control system for the electrically powered artificial limbs according to claim 1, wherein said controlling means comprises
   a variable condenser element having a capacitance which varies in response to movements of the human body,
   the current for driving said motor being controlled in response to the changing capacitance of said condenser element.

5. A control system for the electrically powered artificial limbs according to claim 1, wherein said controlling means comprises
   a push-button displaced in accordance with movements of the human body,
   the current for driving said motor being controlled in response to the changing positions of said push-button.

6. A control system for the electrically powered artificial limbs, comprising
   an artificial limb,
   a motor for driving said artificial limb,
   a power source for supplying driving current to said motor,
   an actuator effective to move in cooperation with movements of the human body,
   means for controlling said driving current for driving said motor in cooperation with the movements of said actuator,
   a stimulator effective to move so as to stimulate the pressure sensitive nerves of the human body, and
   feedback means connected to and directly responsive to the driving current of said motor for controlling the operation of said stimulator in proportion to said driving current.

7. A control system for electrically powered artificial limbs according to claim 6, wherein said actuator and said stimulator are integrally constructed as a movable member, said movable member acting in one direction as an actuator and in the other direction as a stimulator.

8. A control system for electrically powered artificial limbs according to claim 6, wherein said stimulator is arranged in the area in which the operation of said actuator is effected.

9. A control system for electrically powered artificial limbs according to claim 6, wherein the contact surface of said actuator is larger than that of said stimulator.

10. A control system for electrically powered artificial limbs according to claim 6, wherein said means for controlling the operation of said stimulator comprises
    an electromagnetic means to be controlled through the current of said motor.

11. A control for the electrically powered artificial limbs, comprising
    an artificial limb,
    a motor for driving said artificial limb,
    a power source for supplying driving current to said motor,
    means for preventing said motor from being overloaded with said driving current,
    means for controlling said current for driving said motor in accordance with movements of the human body, and
    feedback means connected to and directly responsive to the driving current of said motor for stimulating the pressure sensitive nerves of the human body in proportion to said driving current.

12. A control system for electrically powered artificial limbs according to claim 11, wherein said preventing means comprises
    a transistor for preventing said motor from being overloaded and said controlling means comprises
    a variable resistor element connected to the base of said transistor.

References Cited

UNITED STATES PATENTS

| | | | |
|---|---|---|---|
| 3,418,661 | 12/1968 | Allison et al. | 3—1.1 |
| 3,423,765 | 1/1969 | Salisbury | 3—1.1 |

FOREIGN PATENTS

| | | | |
|---|---|---|---|
| 1,079,358 | 8/1967 | Great Britain | 3—1.1 |
| 78,793 | 7/1951 | Norway | 3—1.1 |
| 166,099 | 5/1965 | U.S.S.R. | 3—1.1 |

RICHARD A. GAUDET, Primary Examiner

R. L. FRINKS, Assistant Examiner